(12) United States Patent
Kuboya

(10) Patent No.: US 10,591,696 B2
(45) Date of Patent: *Mar. 17, 2020

(54) PROJECTION LENS UNIT OF PROJECTOR AND PROJECTOR

(71) Applicant: FUJIFILM Corporation, Tokyo (JP)

(72) Inventor: Hiroshi Kuboya, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,981

(22) Filed: Jun. 24, 2019

(65) Prior Publication Data

US 2019/0310544 A1  Oct. 10, 2019

Related U.S. Application Data

(63) Continuation of application No. 16/013,945, filed on Jun. 21, 2018, now Pat. No. 10,401,720, which is a (Continued)

(30) Foreign Application Priority Data

Jan. 29, 2016 (JP) .................................. 2016-016204

(51) Int. Cl.
*G03B 21/14* (2006.01)
*G02B 7/02* (2006.01)
(Continued)

(52) U.S. Cl.
CPC ............... *G02B 7/02* (2013.01); *G02B 7/008* (2013.01); *G02B 7/023* (2013.01); *G02B 7/04* (2013.01);
(Continued)

(58) Field of Classification Search
CPC .... G03B 21/2066; G03B 21/00; G03B 21/14; G03B 21/2033; G03B 21/147;
(Continued)

(56) References Cited

U.S. PATENT DOCUMENTS 10,401,720 B2 * 9/2019 Kuboya ............ G02B 27/0955
2006/0007556 A1 * 1/2006 Okajima ................ G02B 7/028
359/649

(Continued)

FOREIGN PATENT DOCUMENTS

JP  2000180687  6/2000
JP  2005128217  5/2005

(Continued)

OTHER PUBLICATIONS

"International Search Report (Form PCT/ISA/210)" of PCT/JP2016/086567, dated Mar. 14, 2017, with English translation thereof, pp. 1-5.

(Continued)

*Primary Examiner* — Cara E Rakowski
*Assistant Examiner* — Magda Cruz
(74) *Attorney, Agent, or Firm* — JCIPRNET

(57) ABSTRACT

A projection lens unit (15) of a projector (10) is disposed in a state in which an optical axis (CL) of the projection lens unit deviates from a center of an image forming panel (14); a first lens holder (43) of a lens barrel (40) includes holding pieces (55a, 55b) that are provided at intervals in a circumferential direction of a first lens group (L1) and are engaged with a first portion (A1) of the first lens group positioned on a side to which the image forming panel is shifted, and a holding piece (55c) that is engaged with a second portion (A2) of the first lens group positioned on a side opposite to the side to which the image forming panel is shifted; and the linear expansion coefficient of each of the holding pieces is lower than the linear expansion coefficient of the holding piece.

20 Claims, 8 Drawing Sheets

Related U.S. Application Data continuation of application No. PCT/JP2016/086567, filed on Dec. 8, 2016.

(51) Int. Cl.
*G02B 7/00* (2006.01)
*G03B 21/16* (2006.01)
*G03B 21/00* (2006.01)
*G02B 7/04* (2006.01)
*G02B 9/62* (2006.01)
*G02B 27/09* (2006.01)
*G03B 21/20* (2006.01)
*G02B 13/16* (2006.01)

(52) U.S. Cl.
CPC ............ *G02B 9/62* (2013.01); *G02B 27/0955* (2013.01); *G03B 21/00* (2013.01); *G03B 21/14* (2013.01); *G03B 21/147* (2013.01); *G03B 21/16* (2013.01); *G03B 21/2066* (2013.01); *G02B 13/16* (2013.01); *G03B 21/2033* (2013.01)

(58) Field of Classification Search
CPC . G03B 21/16; G02B 7/02; G02B 7/04; G02B 9/62; G02B 27/0955; G02B 7/008; G02B 7/023; G02B 13/16
See application file for complete search history.

(56) References Cited

U.S. PATENT DOCUMENTS

2007/0236810 A1* 10/2007 Masui .................... G02B 7/023
                                                            359/740
2010/0171937 A1  7/2010  Hirata et al.
2012/0162753 A1  6/2012  Tatsuno
2012/0300321 A1  11/2012 Kuryo
2017/0242213 A1  8/2017  Kuroda
2017/0242324 A1  8/2017  Kuroda
2017/0363940 A1  12/2017 Kayano
2018/0299759 A1  10/2018 Kuboya

FOREIGN PATENT DOCUMENTS

| | | |
|---|---|---|
| JP | 2007003750 | 1/2007 |
| JP | 2008058654 | 3/2008 |
| JP | 2009271448 | 11/2009 |
| JP | 2010160296 | 7/2010 |
| JP | 2012137622 | 7/2012 |
| JP | 2012242728 | 12/2012 |
| JP | 2014059333 | 4/2014 |
| WO | 03040785 | 5/2003 |
| WO | 2016084599 | 6/2016 |
| WO | 2016084603 | 6/2016 |
| WO | 2016158374 | 10/2016 |
| WO | 2017130579 | 8/2017 |

OTHER PUBLICATIONS

"Written Opinion of the International Searching Authority (Form PCT/ISA/237)" of PCT/JP2016/086567, dated Mar. 14, 2017, with English translation thereof, pp. 1-7.

"Office Action of Japan Counterpart Application," dated Mar. 19, 2019, with English translation thereof, p. 1-p. 6.

* cited by examiner

PROJECTION LENS UNIT OF PROJECTOR AND PROJECTOR

CROSS-REFERENCE TO RELATED APPLICATIONS

This is a continuation application of and claims the priority benefit of a prior application Ser. No. 16/013,945 filed on Jun. 21, 2018, now allowed. The prior application Ser. No. 16/013,945 is a Continuation of PCT International Application No. PCT/JP2016/086567 filed on Dec. 8, 2016, which claims priority under 35 U.S.C. § 119(a) to Japanese Patent Application No. 2016-016204 filed on Jan. 29, 2016. Each of the above application(s) is hereby expressly incorporated by reference, in its entirety, into the present application.

BACKGROUND OF THE INVENTION

1. Field of the Invention

The present invention relates to a projection lens unit of a projector and a projector.

2. Description of the Related Art

A projector projects light, which is applied to an image forming panel from a light source, onto a projection surface through a projection lens unit to display an image. In a recent projector, the illuminance of a projected image has been further improved through the improvement of an image forming panel and a light source than in the related art. As a result, unnecessary light, which does not contribute to the formation of an image, is also increased, and the temperature of a lens barrel of a projection lens unit becomes higher than that in the related art in a case in which the unnecessary light is removed by the lens barrel or a light screen of the projection lens unit.

In a projector disclosed in JP2005-128217A, a reflective region is provided on a portion, which receives unnecessary light, of a lens holder, a stop, or the like of a lens barrel and the absorption of unnecessary light is suppressed. Accordingly, a rise in the temperature of the lens barrel is suppressed, so that the deformation of the lens barrel caused by a rise in temperature is suppressed.

In a projector disclosed in JP2014-59333A, an unnecessary light-receiving member overlaps with a lens holder of a lens barrel, and the surface of a contact portion of the lens holder, which is in contact with the unnecessary light-receiving member, is formed in an uneven shape. Accordingly, the transfer of heat to the lens holder from the unnecessary light-receiving member is reduced in comparison with a case in which the entire surface of the unnecessary light-receiving member is in contact with the lens holder. Therefore, a rise in the temperature of the lens barrel is suppressed, so that the deformation of the lens barrel caused by a rise in temperature is suppressed.

Further, the following projectors are known. The projectors are adapted to displace a lens group, which is held by a holding member, in the direction of an optical axis through the thermal expansion of the holding member holding some lenses of a lens barrel against the change of a focal position, which occurs due to the deformation of the lens barrel caused by heat, to correct the change of the focal position (for example, JP2009-271448A and JP2012-242728A).

SUMMARY OF THE INVENTION

In a wide-angle projector that can perform short-distance projection, there is a case where the optical axis of a projection lens unit is disposed to deviate from the center of an image forming panel so that the projector projects light onto a screen, where the screen is located at a position higher than the position of a main body of the projector in a state in which the main body of the projector is installed on a table. In this case, since a deviation occurs in the projection of unnecessary light onto the lens barrel, distribution is caused in the temperature of the lens barrel in the circumferential direction. As a result, distribution in a circumferential direction is caused in the thermal expansion of the lens barrel in the direction of the optical axis and the inclination of a lens group with respect to the optical axis of the projection lens unit is caused. For this reason, there is a concern that image quality may deteriorate.

In the projectors disclosed in JP2005-128217A and JP2014-59333A, the temperature distribution of the lens barrel in the circumferential direction is not canceled and the inclination of the lens group caused by the temperature distribution of the lens barrel in the circumferential direction is not canceled. Even in the projectors disclosed in JP2009-271448A and JP2012-242728A, the lens group is merely displaced in the direction of the optical axis through the thermal expansion of the holding member and the inclination of the lens group caused by the temperature distribution of the lens barrel in the circumferential direction is not canceled.

The invention has been made in consideration of the above-mentioned circumstances, and an object of the invention is to provide a projection lens unit and a projector that can suppress the deterioration of an image caused by temperature distribution of a lens barrel in a circumferential direction.

A projection lens unit according to an aspect of the invention is a projection lens unit of a projector projecting light, which is applied to an image forming panel from a light source, onto a projection surface as image light and disposed in a state in which an optical axis of the projection lens unit deviates from a center of the image forming panel. The projection lens unit comprises a lens barrel that is provided with one or more lens groups and one or more lens holders holding the lens groups, respectively. At least one of the lens holders includes a plurality of holding pieces that are provided at intervals in a circumferential direction of the lens group held by the lens holder and are engaged with an outer peripheral portion of the lens group, of a first portion and a second portion of the lens group where the lens group is divided as to the two portions by a plane perpendicular to a shift direction in which the image forming panel is shifted from the optical axis and including the optical axis, the plurality of holding pieces including one or more holding pieces engaged with the first portion, which is positioned on a side to which the image forming panel is shifted, and one or more holding pieces engaged with the second portion that is positioned on a side opposite to the side to which the image forming panel is shifted. A linear expansion coefficient of a first material, which forms the holding pieces engaged with the first portion, is lower than a linear expansion coefficient of a second material that forms the holding pieces engaged with the second portion.

Further, a projector according to an aspect of the invention comprises the projection lens unit, an image forming panel that is disposed such that a center of the image forming panel deviates from an optical axis of the projection lens unit, and a light source that applies light to the image forming panel.

In a case in which the invention is used, it is possible to provide a projection lens unit and a projector that can suppress the deterioration of an image caused by a deviation in the temperature of a lens barrel.

DESCRIPTION OF THE PREFERRED EMBODIMENTS

Figure 1:
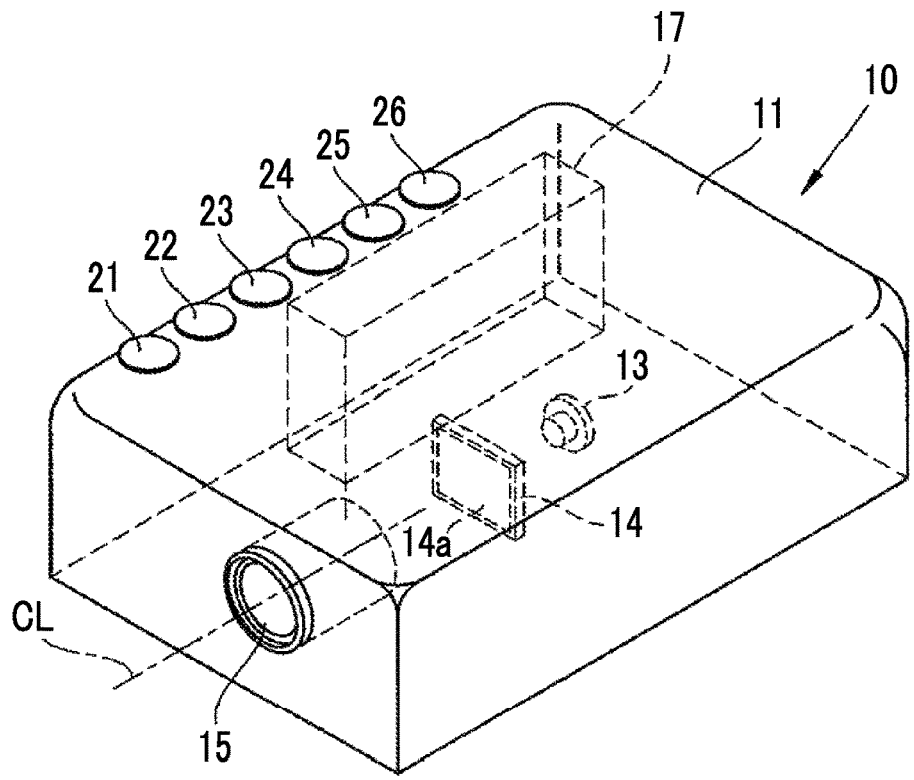
FIG. 1 is a perspective view of an example of a projector illustrating an embodiment of the invention.

FIG. 1 shows the structure of an example of a projector illustrating an embodiment of the invention.

In the projector 10 shown in FIG. 1, a light source 13, an image forming panel 14, a projection lens unit 15, and a control unit 17 are received in a case 11. A zoom dial 21, a light quantity adjustment dial 22, a focus dial 23, a vertical attitude adjustment dial 24, a horizontal attitude adjustment dial 25, and an image correction dial 26 are provided on the upper surface of the case 11.

A transmission type liquid crystal panel is used as the image forming panel 14. The light source 13 is disposed on the back surface of the image forming panel 14, that is, on the side of the image forming panel 14 opposite to the projection lens unit 15. An image is given to light, which is emitted from the light source 13, on an image forming surface 14a of the image forming panel 14, and the light to which the image is given is projected onto the projection surface through the projection lens unit 15 as image light.

The control unit 17 allows a red-green-blue (RGB) color image to be displayed on the image forming surface 14a of the image forming panel 14. In addition, the control unit 17 also performs the following control. For example, in a case in which the control unit 17 receives an operation signal of the zoom dial 21, the control unit 17 adjusts the size of the image to be projected onto a screen 20. In a case in which the control unit 17 receives an operation signal of the light quantity adjustment dial 22, the control unit 17 adjusts the brightness of the image to be projected onto the screen 20. In a case in which the control unit 17 receives an operation signal of the focus dial 23, the control unit 17 allows a focus adjustment mechanism (not shown) of the projection lens unit 15 to operate to adjust the focus of a central portion of the image projected onto the screen 20. In a case in which the control unit 17 receives an operation signal of the vertical attitude adjustment dial 24, the control unit 17 allows a first motor of an attitude adjustment device (not shown) to be driven. Accordingly, the control unit 17 allows the projection lens unit 15 to be rotated about a horizontal axis orthogonal to an optical axis CL to adjust the inclination of the projection lens unit 15 in an up-down direction. In a case in which the control unit 17 receives an operation signal of the horizontal attitude adjustment dial 25, the control unit 17 allows a second motor of the attitude adjustment device 17 to be driven. Accordingly, the control unit 17 allows the projection lens unit 15 to be rotated about a vertical axis orthogonal to the optical axis CL to adjust the inclination of the projection lens unit 15 in a lateral direction. In a case in which the control unit 17 receives an operation signal of the image correction dial 26, the control unit 17 changes the display size and shape of an image to be formed on the image forming surface 14a of the image forming panel 14. For example, the control unit 17 changes the display size and shape of an image so that a rectangular image is not displayed as a trapezoidal image according to the inclination angle of the projection lens unit 15.

Figure 2:
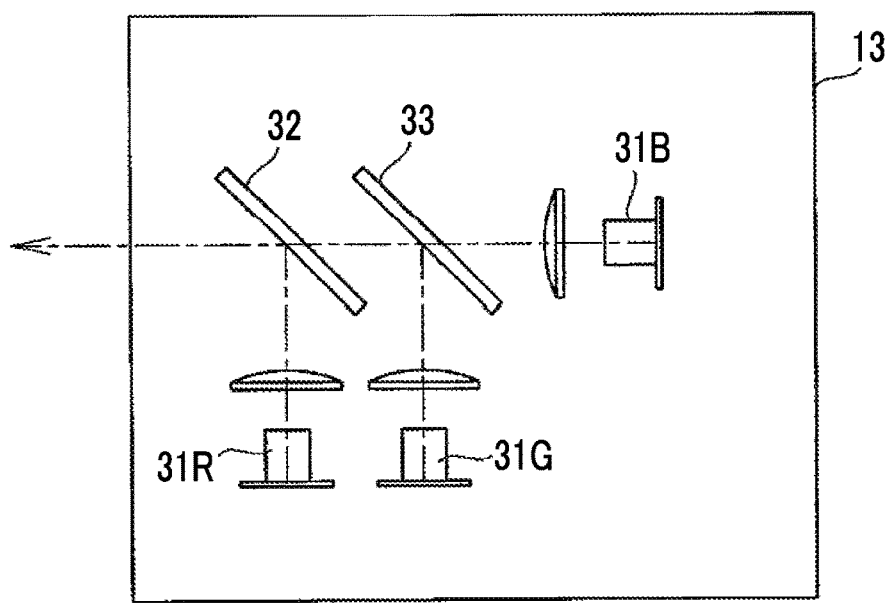
FIG. 2 is a schematic diagram of a light source of the projector of FIG. 1.

FIG. 2 shows the structure of the light source 13.

The light source 13 includes a light emitting diode (LED) 31R that emits red (R) light, a LED 31G that emits green (G) light, and a LED 31B that emits blue (B) light. Light emitted from the LED 31R is reflected by a dichroic mirror 32. Light emitted from the LED 31G is reflected by a dichroic mirror 33, and is transmitted through the dichroic mirror 32. Light emitted from the LED 31B is transmitted through the dichroic mirror 32 and the dichroic mirror 33. Accordingly, three kinds of color light, that is, R light, G light, and B light are emitted to the same optical path. A xenon lamp, a halogen lamp, or a super high-pressure mercury lamp, which emits white light, may be used instead of the LED 31R, the LED 31G, and the LED 31B of the light source 13.

Figure 3:
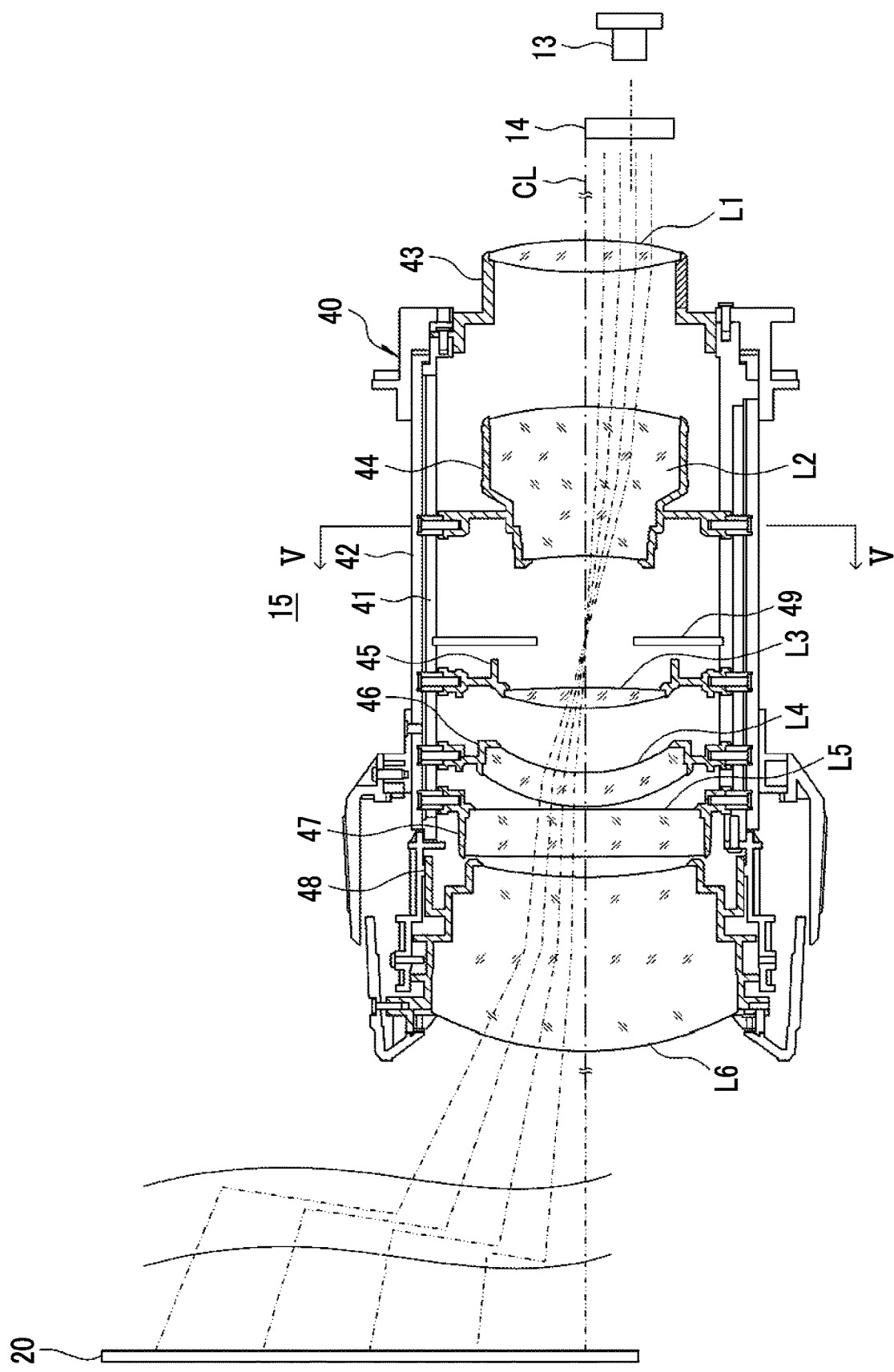
FIG. 3 is a longitudinal sectional view of a projection lens unit of the projector of FIG. 1.

FIG. 3 shows the structure of the projection lens unit 15.

Light emitted from the projection lens unit 15 is projected onto the screen 20, which is a projection surface, vertically above the optical axis CL of the projection lens unit 15, as image light. The center of the image forming panel 14 is disposed so as to be shifted from the optical axis CL in a direction opposite to a direction where the central position of the image projected onto the screen 20 is shifted from the optical axis CL, that is, to the vertically lower side of the optical axis CL.

Figure 4:
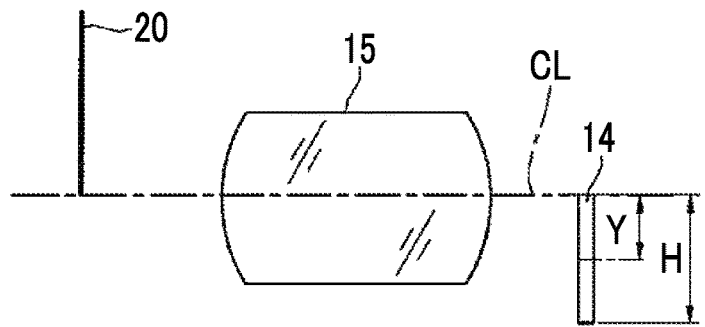
FIG. 4 is a schematic diagram illustrating the shift ratio of an image forming panel to an optical axis of the projection lens unit.

Here, the shift ratio of the image forming panel 14 will be described with reference to FIG. 4.

In a case in which a shift amount (distance) between the optical axis CL of the projection lens unit 15 and the center of the image forming panel 14 is denoted by Y and the length of the image forming panel 14 in a shift direction is denoted by H, the shift ratio S of the image forming panel 14 is defined by "S=Y/H". That is, in the case of "S=0.5", the upper end face of the image forming panel 14 coincides with the optical axis CL of the projection lens unit 15 as shown in FIG. 4. Further, in the case of "S>0.5 (S is larger than 0.5)", the image forming panel 14 deviates from the optical axis CL of the projection lens unit 15. Furthermore, in the case of "S=0", the center of the image forming panel 14 and the optical axis CL of the projection lens unit 15 coincide with each other and the disposition of the image forming panel 14 and the projection lens unit 15 is close to a long-distance projection type in the related art.

It is preferable that the shift ratio S of the image forming panel 14 is set to exceed 0.4 and to be lower than 0.7. In a case in which the shift ratio S exceeds 0.4, the influence of temperature on the projection lens unit 15 in a vertical direction does not appear in comparison with a case in which the shift ratio S is 0.4 or less. On the other hand, in a case in which the shift ratio S is lower than 0.7, the shift amount Y of the image forming panel 14 is not excessively increased, an increase in the size of a lens system is suppressed, and the deterioration of manufacturing suitability is prevented in comparison with a case in which the shift ratio S is 0.7 or more. Accordingly, in a case in which the shift ratio S of the image forming panel 14 is set in the above-mentioned range, it is possible to provide a high-performance product while reducing the influence of temperature on the projection lens unit 15 in the vertical direction. It is more preferable that the shift ratio S of the image forming panel 14 is set to exceed 0.45 and to be lower than 0.6.

Referring to FIG. 3 again, the projection lens unit 15 includes: six lens groups, that is, a first lens group L1, a second lens group L2, a third lens group L3, a fourth lens group L4, a fifth lens group L5, and a sixth lens group L6 arranged in this order from the image forming panel 14; an aperture stop 49 that adjusts the brightness (F-Number) of the projection lens unit 15; and a lens barrel 40 that receives the first to sixth lens groups L1 to L6 and the aperture stop 49. Each of the first to sixth lens groups L1 to L6 is formed of one or a plurality of lenses.

The structure of each of the first to sixth lens groups L1 to L6 is exemplary, and can be appropriately modified according to an optical design. Further, the aperture stop 49 is disposed between the second lens group L2 and third lens group L3 in an example shown in FIG. 3, but the disposition of the aperture stop 49 is also exemplary, and can be appropriately modified according to an optical design.

The lens barrel 40 includes a cylindrical lens barrel body 41, a cam barrel 42, a first lens holder 43, a second lens holder 44, a third lens holder 45, a fourth lens holder 46, a fifth lens holder 47, and a sixth lens holder 48.

The first to sixth lens holders 43 to 48 are disposed in the lens barrel body 41, the first lens holder 43 holds the first lens group L1, the second lens holder 44 holds the second lens group L2, the third lens holder 45 holds the third lens group L3, the fourth lens holder 46 holds the fourth lens group L4, the fifth lens holder 47 holds the fifth lens group L5, and the sixth lens holder 48 holds the sixth lens group L6.

Further, the first lens holder 43 is fixed to an end portion of the lens barrel body 41 facing the image forming panel 14, and the sixth lens holder 48 is fixed to an end portion of the lens barrel body 41 facing the screen 20. Furthermore, the second to fifth lens holders 44 to 47 are adapted to be movable in the direction of the optical axis in the lens barrel body 41, and are moved in the direction of the optical axis by the cam barrel 42.

Figure 5:
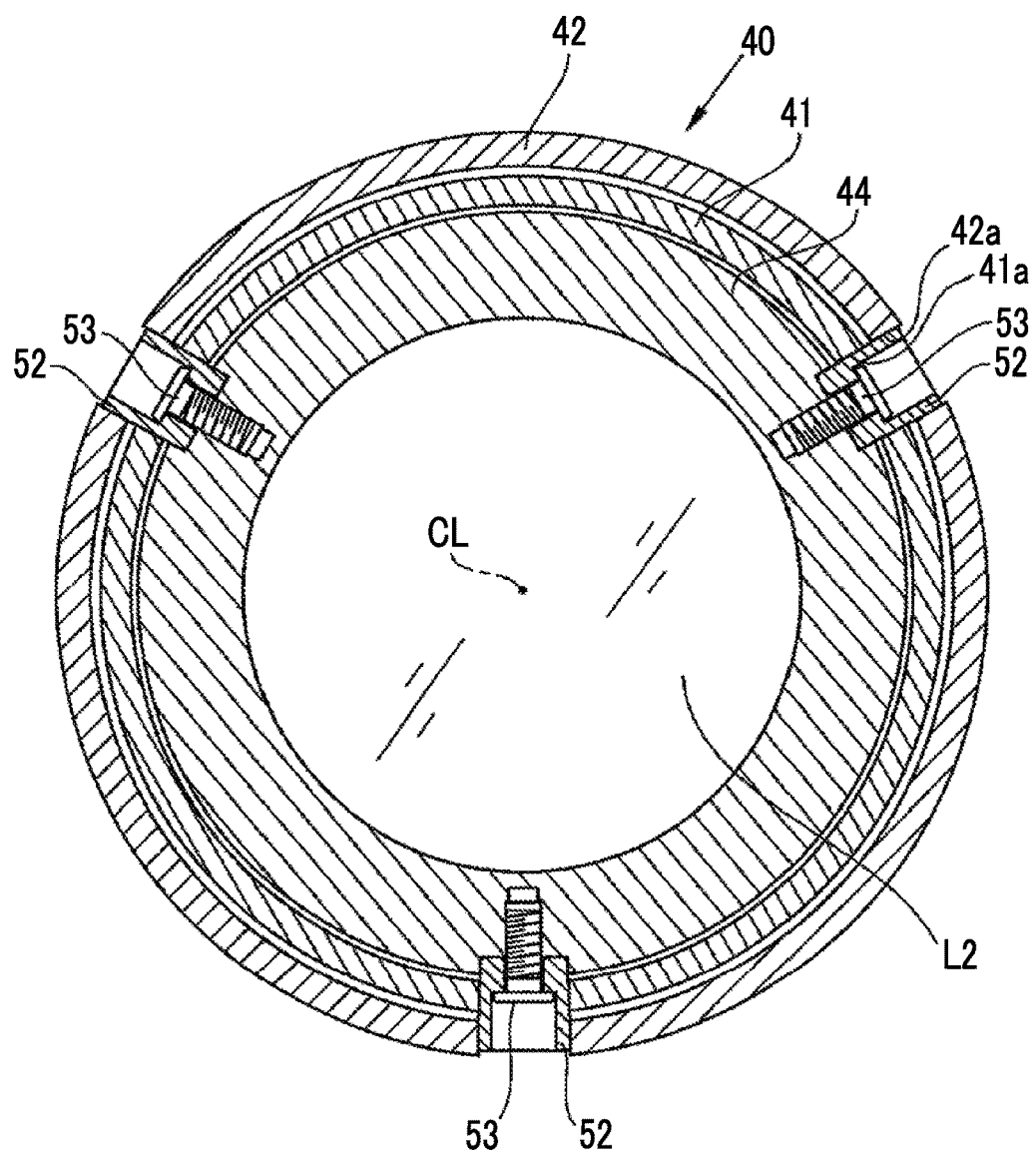
FIG. 5 is a cross-sectional view of the projection lens unit of FIG. 3 taken along line V-V.

FIG. 5 shows the structure of a mechanism for moving the second lens holder 44.

A plurality of cam pins 52 are mounted on the outer periphery of the second lens holder 44 by mounting screws 53. The cam pins 52 protrude outward from notches 41a that are formed at the lens barrel body 41 in parallel with the optical axis CL, and are engaged with cam grooves 42a that are formed at the cam barrel 42 so as to be inclined with respect to the optical axis CL. In a case in which the cam barrel 42 is rotated relative to the lens barrel body 41, the second lens holder 44 is moved in the direction of the optical axis.

Since the third to fifth lens holders 45 to 47 also have the same structure as the second lens holder 44, the third to fifth lens holders 45 to 47 are moved in the direction of the optical axis with the rotation of the cam barrel 42. For example, an operation for adjusting a focus, an operation for changing magnification, or the like is performed in a case in which the second to fifth lens holders 44 to 47 are appropriately moved in the direction of the optical axis.

The lens barrel body 41, the cam barrel 42, and the first to sixth lens holders 43 to 48 are made of, for example, a synthetic resin, such as polycarbonate.

Figure 6:
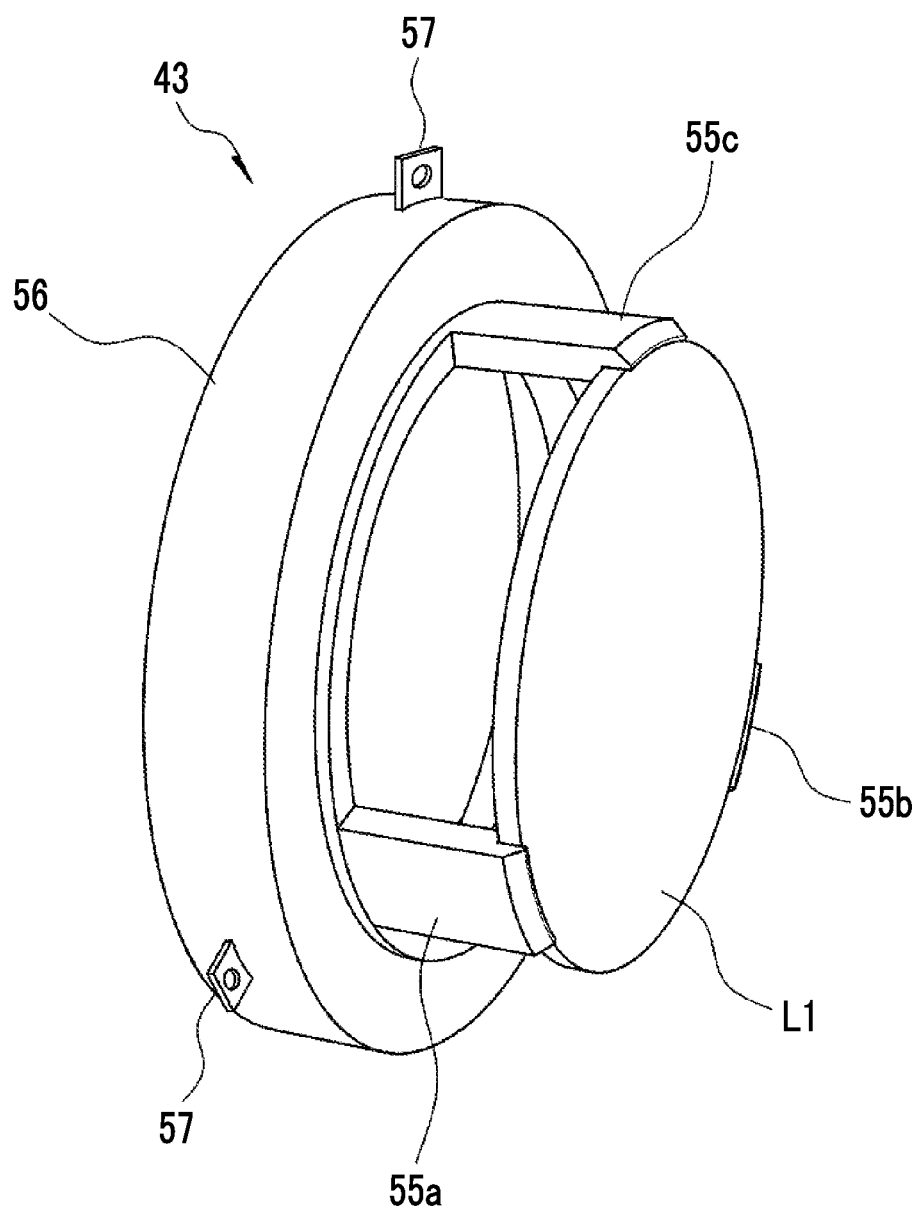
FIG. 6 is a perspective view of a first lens holder of the projection lens unit of FIG. 3.
Figure 7:
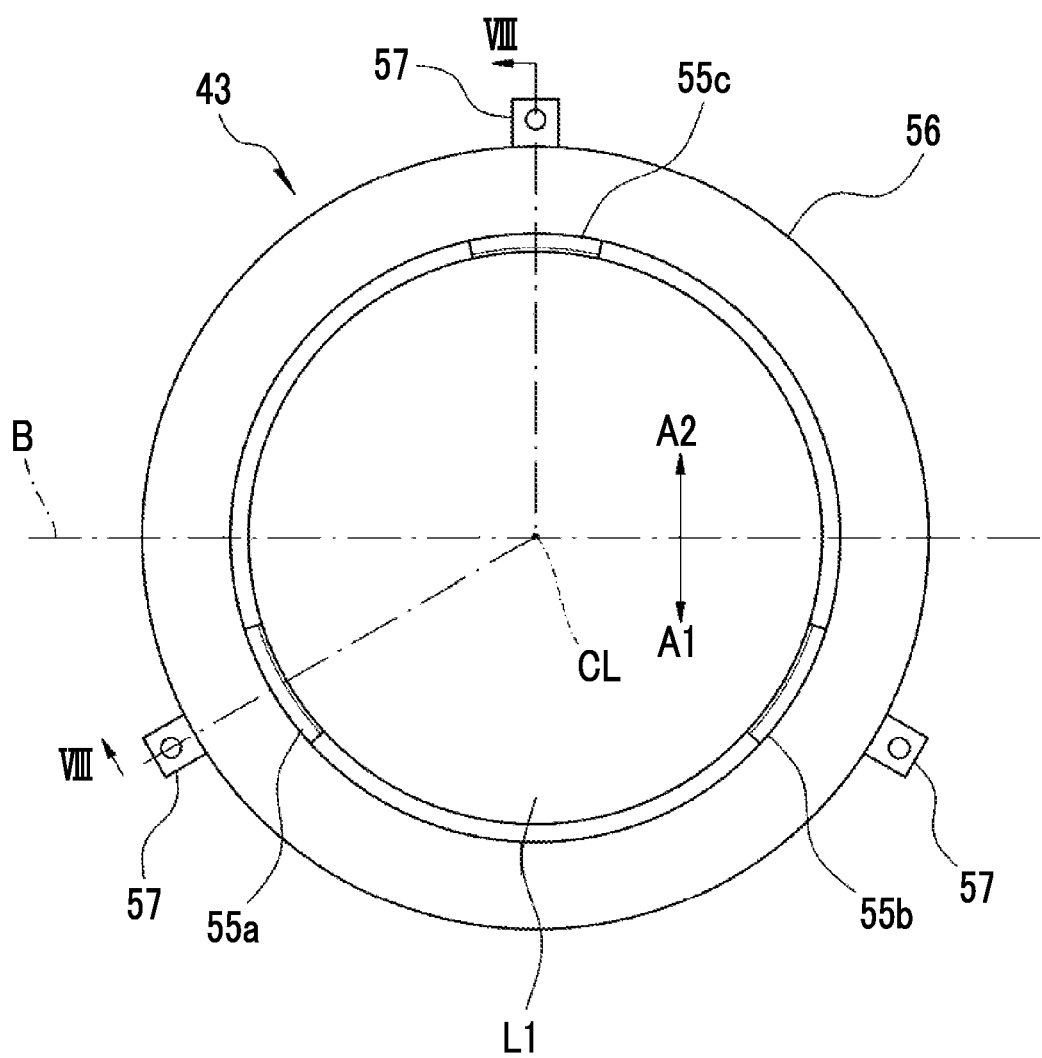
FIG. 7 is a front view of the first lens holder of FIG. 6.
Figure 8:
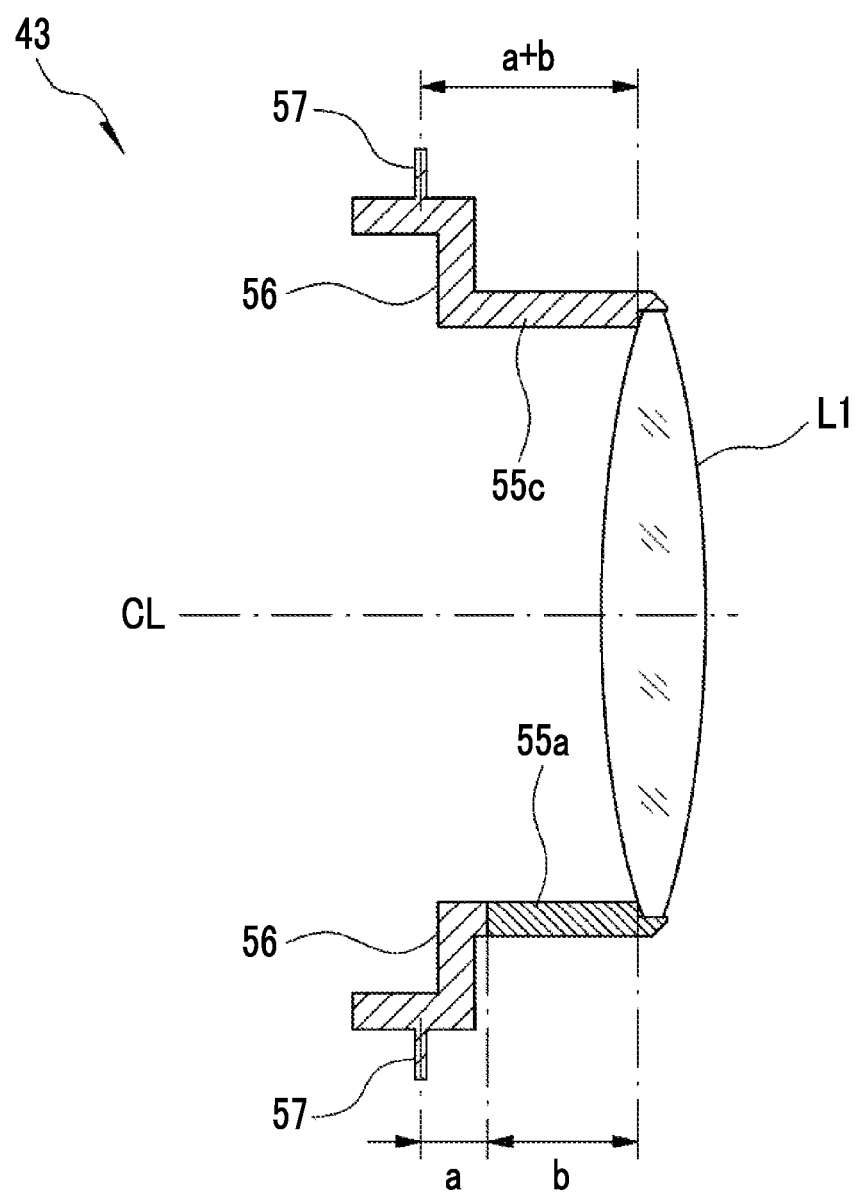
FIG. 8 is a cross-sectional view of the first lens holder of FIG. 7 taken along line VIII-VIII.

FIGS. 6 to 8 show the structure of the first lens holder 43.

The first lens holder 43 includes a holding piece 55a, a holding piece 55b, and a holding piece 55c that are engaged with the outer peripheral portion of the first lens group L1, and a substantially cylindrical frame portion 56 that supports these three holding pieces.

A plurality of fixing portions 57, which are to be fixed to the lens barrel body 41, are provided on the outer peripheral surface of the frame portion 56. The fixing portions 57 are provided on the same circumference on the outer peripheral surface of the frame portion 56, are arranged at substantially regular intervals in a circumferential direction, and are formed integrally with the frame portion 56 so as to protrude outward from the frame portion 56.

The holding piece 55a, the holding piece 55b, and the holding piece 55c are provided on an inner edge portion of one end face of the frame portion 56 at substantially regular intervals in the circumferential direction, and are formed integrally with the frame portion 56 so as to protrude from the frame portion 56 along the optical axis CL of the projection lens unit 15. The distal end portion of each of the holding piece 55a, the holding piece 55b, and the holding piece 55c are engaged with the outer peripheral portion of the first lens group L1 at substantially regular intervals in the circumferential direction of the first lens group L1.

In a case in which the first lens group L1 is divided into a first portion A1 positioned on a side to which the image forming panel 14 is shifted (vertically lower side) and a second portion A2 positioned on a side opposite to the side to which the image forming panel 14 is shifted (vertically upper side) by a plane B that is perpendicular to the shift direction where the image forming panel 14 is shifted from the optical axis CL of the projection lens unit 15 and includes the optical axis CL, as shown in FIG. 7, the holding pieces 55a and 55b are engaged with the first portion A1 and the holding piece 55c is engaged with the second portion A2. Further, the linear expansion coefficient of each of the holding pieces 55a and 55b to be engaged with the first portion A1 is set to be lower than the linear expansion coefficient of the holding piece 55c to be engaged with the second portion A2.

The above-mentioned first lens holder 43 can be produced, for example, as described below by multi-color molding using different resin materials. First, the holding piece 55c and the frame portion 56 are primarily molded integrally with each other using a second resin material. Next, only a cavity mold of a core mold and a cavity mold used in the primary molding is exchanged, and the holding pieces 55a and 55b are secondarily molded integrally with the primarily molded body, which is formed of the holding piece 55c and the frame portion 56, using a first resin material of which the linear expansion coefficient is lower than the linear expansion coefficient of the second resin material. Accordingly, the first lens holder 43, of which the holding pieces 55a, 55b, and 55c are integrated with the frame portion 56 and the linear expansion coefficient of each of the holding pieces 55a and 55b to be engaged with the first portion A1 is lower than the linear expansion coefficient of the holding piece 55c to be engaged with the second portion A2, is obtained.

Further, the first lens holder 43 can also be produced, for example, as described below by insert molding. First, the holding pieces 55a and 55b are produced in advance using the first resin material. Next, the holding pieces 55a and 55b, which have been produced in advance, are inserted into a mold for integrally molding the holding piece 55c and the frame portion 56, and the mold is filled with the second resin material to mold the holding piece 55c and the frame portion 56 integrally with the holding pieces 55a and 55b in a state in which the holding pieces 55a and 55b are inserted into the mold. Accordingly, the first lens holder 43, of which the holding pieces 55a, 55b, and 55c are integrated with the frame portion 56 and the linear expansion coefficient of each of the holding pieces 55a and 55b to be engaged with the first portion A1 is lower than the linear expansion coefficient of the holding piece 55c to be engaged with the second portion A2, is obtained.

In terms of increasing the joint strength between the holding pieces 55a and 55b made of the first resin material and the frame portion 56 made of the second resin material, it is preferable that compatibility between the first and second resin materials is high in all of the multi-color molding and the insert molding. Accordingly, it is preferable that composite materials, which are obtained by adding fillers to a common resin base material and have different linear expansion coefficients according to the filler contents, are used as the first and second resin materials. The filler is an additive to be added to the resin base material. Particularly, in this specification, the filler means a material that adjusts the linear expansion coefficient of the resin base material according to the amount thereof to be added. For example, in a case in which polycarbonate is used as the resin base material and a glass fiber is used as the filler, the linear expansion coefficient of a simple substance of polycarbonate is $6.5 \times 10^{-5}/°$ C., the linear expansion coefficient of a composite material of which the content percentage of a glass fiber per unit weight is 20% is $2.5 \times 10^{-5}/°$ C., and the linear expansion coefficient of a composite material of which the content percentage of a glass fiber per unit weight is 40% is $1.9 \times 10^{-5}/°$ C.

Further, at least one of the holding pieces 55a and 55b or the holding piece 55c may be formed separately from the frame portion 56, and the separately formed holding piece may adhere to the frame portion 56 or may be fitted to the frame portion 56 so as to be joined to the frame portion 56. In this case, it is easy to manage the dimensions of each member. Furthermore, the structure of a mold can also be simplified in comparison with a case in which the holding pieces 55a and 55b, the holding piece 55c, and the frame portion 56 are integrally molded. Moreover, since stable joint strength can be obtained between the frame portion 56 and the holding piece formed separately from the frame portion 56 regardless of compatibility between the material of the frame portion 56 and the material of the holding piece formed separately from the frame portion 56, the holding piece formed separately from the frame portion 56 can be made of various materials, such as metal, instead of a resin.

Next, the meaning of making the linear expansion coefficient of each of the holding pieces 55a and 55b be lower than the linear expansion coefficient of the holding piece 55c will be described with reference to FIG. 8.

Light, which is more than the light applied to the holding piece 55c engaged with the second portion A2 of the first lens group L1 positioned on the side opposite to the side to which the image forming panel 14 is shifted, is applied to the holding pieces 55a and 55b, which are engaged with the first portion A1 of the first lens group L1 positioned on the side to which the image forming panel 14 is shifted, from the light source 13. As a result, the temperature of each of the holding pieces 55a and 55b becomes higher than the temperature of the holding piece 55c due to the turning-on of the light source 13.

A rise in the temperature of each of the holding pieces 55a and 55b and the holding piece 55c, which is caused by the turning-on of the light source 13, is also changed depending on the quantity of light, which is emitted from the light source 13, per unit time, or the like. However, here, it is assumed that the temperature of each of the holding pieces 55a and 55b rises up to 80° C. from the room temperature (25° C.) and the temperature of the holding piece 55c rises up to 40° C. from the room temperature.

Further, the diameter of the first lens group L1 is set to 20 mm; a distance a between each fixing portion 57 of the frame portion 56, which is fixed to the lens barrel body 41, and the proximal end portion of each of the holding pieces 55a and 55b and the holding piece 55c in the direction of the optical axis is set to 5 mm; and a distance b between the proximal end portion of each of the holding pieces 55a and 55b and the holding piece 55c and a distal end portion of each holding piece, which is a portion of each holding piece engaged with the outer peripheral portion of the first lens group L1, in the direction of the optical axis is set to 30 mm.

First, in a case in which all of the holding pieces 55a and 55b, the holding piece 55c, and the frame portion 56 are made of a simple substance of polycarbonate (linear expansion coefficient: $6.5 \times 10^{-5}/°$ C.) and the temperature of each of the holding pieces 55a and 55b rises up to 80° C. from the room temperature (25° C.) due to the turning-on of the light source 13, a change in a distance a+b between the fixing portion 57 and the distal end portion of each of the holding pieces 55a and 55b becomes "(80° C.−25° C.)×$6.5 \times 10^{-5}$/° C.35 mm≅$12.5 \times 10^{-2}$ mm". On the other hand, in a case in which the temperature of the holding piece 55c rises up to 40° C. from the room temperature due to the turning-on of the light source 13, a change in the distance a+b between the fixing portion 57 and the distal end portion of the holding piece 55c becomes "(40° C.−25° C.)×$6.5 \times 10^{-5}$/° C.×35≅$4.6 \times 10^{-2}$ mm". In this case, the inclination of the first lens group L1 with respect to a plane perpendicular to the optical axis CL corresponds to 0.2°.

Next, in a case in which each of the holding pieces 55a and 55b is made of a composite material (linear expansion coefficient: $1.9 \times 10^{-5}$/° C.) in which 40% of a glass fiber per unit weight is contained in polycarbonate, each of the holding piece 55c and the frame portion 56 is made of a simple substance of polycarbonate (linear expansion coefficient $6.5 \times 10^{-5}$/° C.), and the temperature of each of the holding pieces 55a and 55b rises up to 80° C. from the room temperature (25° C.) due to the turning-on of the light source 13, a change in the distance a+b between the fixing portion 57 and the distal end portion of each of the holding pieces 55a and 55b becomes "(80° C.−25° C.)×$6.5 \times 10^{-5}$/° C.×5 mm+(80° C.-25° C.)×$1.9 \times 10^{-5}$/° C.×30 mm≅$4.9 \times 10^{-2}$ mm". On the other hand, in a case in which the temperature of the holding piece 55c rises up to 40° C. from the room temperature due to the turning-on of the light source 13, a change in the distance a+b between the fixing portion 57 and the distal end portion of the holding piece 55c becomes "(40° C.−25° C.)×$6.5 \times 10^{-5}$/° C.×35 mm≅$4.6 \times 10^{-2}$ mm". In this case, the inclination of the first lens group L1 with respect to a plane perpendicular to the optical axis CL corresponds to 0.0008°.

In a case in which the linear expansion coefficient of each of the holding pieces 55a and 55b to be engaged with the first portion A1 of the first lens group L1, which is positioned on the side to which the image forming panel 14 is shifted, is set to be lower than the linear expansion coefficient of the holding piece 55c to be engaged with the second portion A2 of the first lens group L1 that is positioned on the side opposite to the side to which the image forming panel 14 is shifted as described above, it is possible to suppress the inclination of the first lens group L1 that is caused by the temperature distribution of the lens barrel 40 in the circumferential direction. Accordingly, it is possible to suppress the deterioration of an image.

The first lens holder 43 provided with three holding pieces, that is, the holding pieces 55a, 55b, and 55c has been described so far, but the first lens holder 43 may include one or more holding pieces to be engaged with the first portion A1 of the first lens group L1 and one or more holding pieces to be engaged with the second portion A2 of the first lens group L1.

Figure 9:
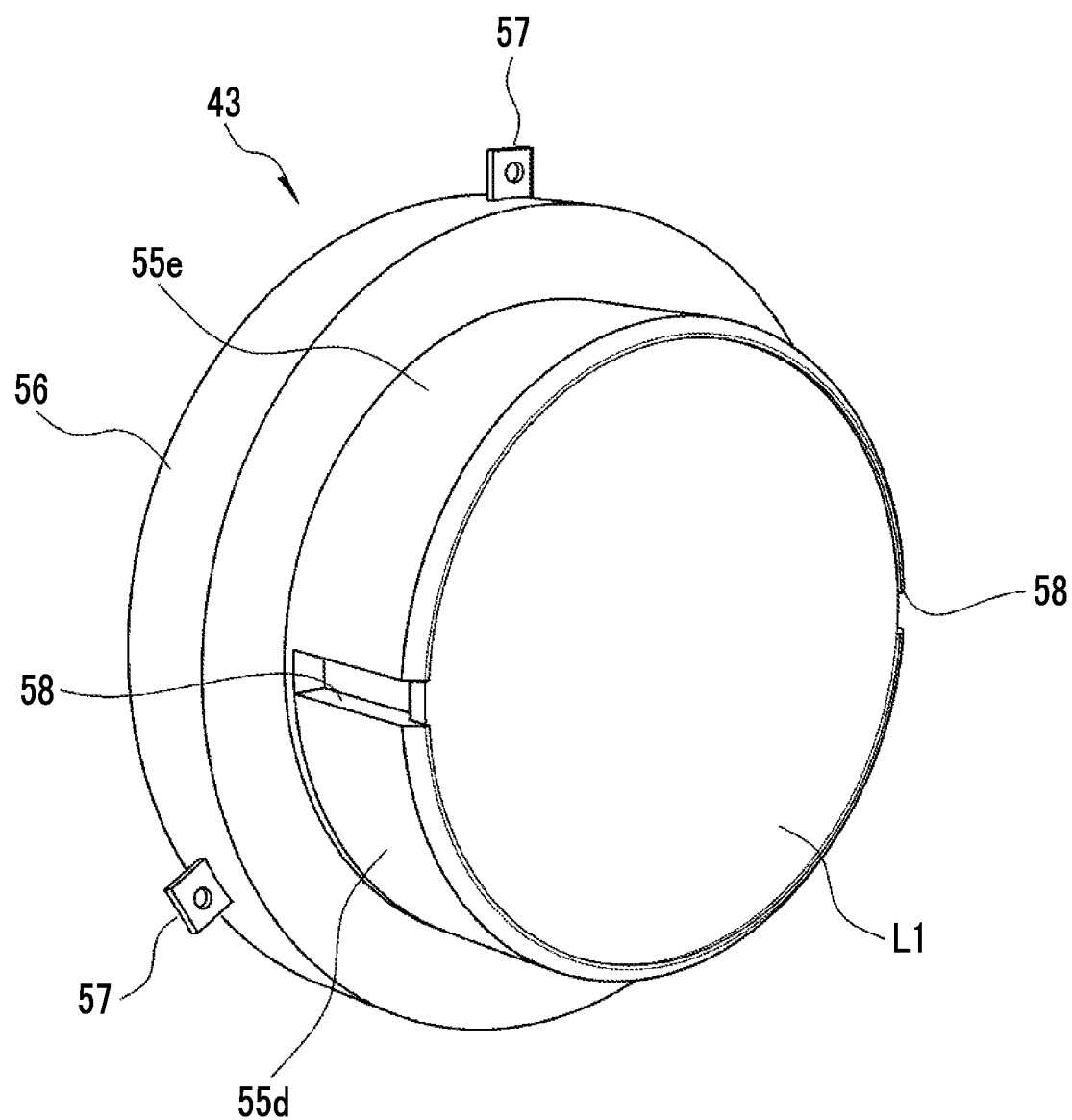
FIG. 9 is a perspective view showing a modification example of the first lens holder of FIG. 6.
Figure 10:
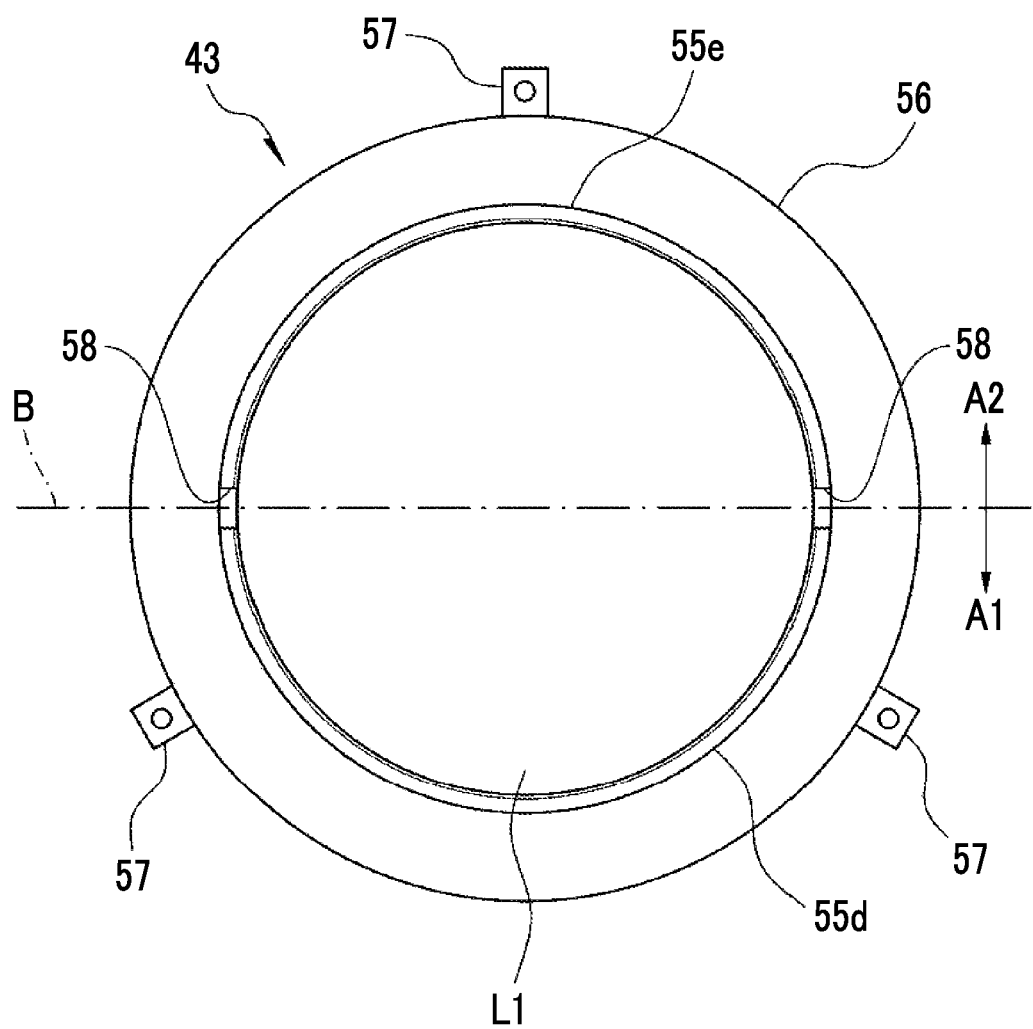
FIG. 10 is a front view of the first lens holder of FIG. 9.

FIGS. 9 and 10 show the structure of a modification example of the first lens holder 43, and the first lens holder 43 includes one holding piece 55d to be engaged with the first portion A1 of the first lens group L1 and one holding piece 55e to be engaged with the second portion A2 of the first lens group L1. The linear expansion coefficient of the holding piece 55d to be engaged with the first portion A1 is set to be lower than the linear expansion coefficient of the holding piece 55e to be engaged with the second portion A2.

The holding pieces 55d and 55e have a structure in which a substantially cylindrical frame body coaxial with the optical axis CL of the projection lens unit 15 is formed on an inner edge portion of one end face of the frame portion 56. Further, the holding pieces 55d and 55e have a structure in which two slits 58 extending parallel to the optical axis CL are formed at portions of the frame body crossing a plane B dividing the first lens group L1 into a first portion A1 and a second portion A2 and the frame body is divided from each other in the circumferential direction by the slits 58.

In a case in which the linear expansion coefficient of the holding piece 55d to be engaged with the first portion A1 of the first lens group L1, which is positioned on the side to which the image forming panel 14 is shifted, is set to be lower than the linear expansion coefficient of the holding piece 55e to be engaged with the second portion A2 of the first lens group L1 that is positioned on the side opposite to the side to which the image forming panel 14 is shifted, it is possible to suppress the inclination of the first lens group L1, which is caused by the temperature distribution of the lens barrel 40 in the circumferential direction, even in the first lens holder 43 of this modification example. Accordingly, it is possible to suppress the deterioration of an image.

Further, it is possible to produce the first lens holder 43 of this modification example by multi-color molding using different resin materials or insert molding as in the case of the first lens holder 43 shown in FIGS. 6 to 8, or it is also possible to produce the first lens holder 43 by forming at least one of the holding piece 55d or the holding piece 55e separately from the frame portion 56 and joining the separately formed holding piece to the frame portion 56. Since the holding pieces 55d and 55e are larger than the holding pieces 55a and 55b and the holding piece 55c of the first lens holder 43 shown in FIGS. 6 to 8, it is easy to produce the first lens holder 43 even though the first lens holder 43 is produced by any method of them.

A structure in which the linear expansion coefficient of the holding piece to be engaged with the first portion A1 of the first lens group L1 positioned on the side, to which the image forming panel 14 is shifted, among the plurality of holding pieces of the first lens holder 43 is set to be lower than the linear expansion coefficient of the holding piece to be engaged with the second portion A2 of the first lens group L1 positioned on the side opposite to the side, to which the image forming panel 14 is shifted, has been described above by using the first lens holder 43, which is fixed to the end portion of the lens barrel body 41 facing the image forming panel 14, among the first to sixth lens holders 43 to 48, as an example. However, the above-mentioned structure of the first lens holder 43 can also be used for the other lens holders. Particularly, since the deviation of light applied from the light source 13 is relatively large in the second lens holder 44 disposed closer to the image forming panel 14 than the aperture stop 49 as in the first lens holder 43, the above-mentioned structure of the first lens holder 43 can also be suitably used for the second lens holder 44.

Further, the transmission type liquid crystal panel is used as the image forming panel 14 in the embodiment, but a reflection type liquid crystal panel or a digital micro mirror device (DMD) can also be used. In this case, the light of the light source 13 is applied to the front surface of the image forming panel from the front side of the image forming panel 14 through an illumination optical system using a known prism (not shown) and the like.

As described above, a projection lens unit disclosed in this specification projects light, which is applied to an image forming panel from a light source, onto a projection surface as image light and is disposed in a state in which an optical axis of the projection lens unit deviates from a center of the image forming panel. The projection lens unit of a projector includes a lens barrel that is provided with one or more lens groups and one or more lens holders holding the lens groups, respectively. At least one of the lens holders includes a plurality of holding pieces that are provided at intervals in a circumferential direction of the lens group held by the lens holder and are engaged with an outer peripheral portion of the lens group. Of a first portion and a second portion of the lens group where the lens group is divided as to the two portions by a plane perpendicular to a shift direction in which the image forming panel is shifted from the optical axis and including the optical axis, the plurality of holding pieces include one or more holding pieces engaged with the first portion, which is positioned on a side to which the image forming panel is shifted, and one or more holding pieces engaged with the second portion that is positioned on a side opposite to the side to which the image forming panel is shifted. A linear expansion coefficient of a first material, which forms the holding pieces engaged with the first portion, is lower than a linear expansion coefficient of a second material that forms the holding pieces engaged with the second portion.

Further, in the projection lens unit disclosed in this specification, the lens holder including the holding pieces further includes a frame portion that supports the holding pieces, the frame portion and the holding pieces are made of a resin material and are integrated with each other, and a first resin material as the first material, which forms the holding pieces engaged with the first portion, and a resin material, which forms the holding pieces engaged with the second portion, are formed of second resin materials as second materials having different linear expansion coefficients, respectively.

Furthermore, in the projection lens unit disclosed in this specification, the lens holder including the holding pieces further includes a frame portion that supports the holding pieces, and at least one of the holding pieces engaged with the first portion and the holding pieces engaged with the second portion is formed separately from the frame portion and is joined to the frame portion.

Moreover, in the projection lens unit disclosed in this specification, the first material which forms the holding pieces engaged with the first portion and the second material which forms the holding pieces engaged with the second portion are composite materials, which are obtained by adding fillers for adjusting linear expansion coefficients to a common resin base material, and content percentages of the fillers are different from each other.

The projection lens unit disclosed in this specification further includes an aperture stop, and the lens holder, which holds the lens group disposed closer to the image forming panel than the aperture stop, includes the holding pieces.

A projector disclosed in this specification includes an image forming panel that is disposed such that a center of the image forming panel deviates from an optical axis of the projection lens unit, and a light source that applies light to the image forming panel.

Further, in the projector disclosed in this specification, in a case in which a distance between the optical axis of the projection lens unit and a center of the image forming panel is denoted by Y, a length of the image forming panel in a shift direction where the image forming panel is shifted from the optical axis is denoted by H, and a shift ratio of the image forming panel obtained by dividing the length H into the distance Y is defined by "S=Y/H", and "0.4<S<0.7" is satisfied.

EXPLANATION OF REFERENCES

10: projector
11: case
13: light source
14: image forming panel
14a: image forming surface
15: projection lens unit
17: control unit
20: screen (projection surface)
21: zoom dial
22: light amount adjustment dial
23: focus dial
24: vertical attitude adjustment dial
25: horizontal attitude adjustment dial
26: image correction dial
32: dichroic mirror
33: dichroic mirror
40: lens barrel
41: lens barrel body
42: cam barrel
42a: cam groove
43: first lens holder
44: second lens holder
45: third lens holder
46: fourth lens holder
47: fifth lens holder
48: sixth lens holder
49: aperture stop
52: cam pin
53: mounting screw
55a: holding piece
55b: holding piece
55c: holding piece
55d: holding piece
55e: holding piece
56: frame portion
57: fixing portion
A1: first portion
A2: second portion
B: plane
CL: optical axis
L1: first lens group
L2: second lens group
L3: third lens group
L4: fourth lens group
L5: fifth lens group
L6: sixth lens group

What is claimed is:

1. A projection lens unit of a projector, which is disposed in a state in which an optical axis of the projection lens unit deviates from a center of an image forming panel of the projector, the projection lens unit comprising:
   a lens barrel that is disposed with one or more lens groups and a lens holder holding one or more the lens groups,
   wherein the lens holder includes a first part that is formed of a first material and a second part that is formed of a second material,
   wherein the first part is on a side of the lens holder where the image forming panel is shifted with respect to the optical axis of the projection lens unit,
   wherein the first part is positioned closer to the image forming panel than the second part, and
   wherein a linear expansion coefficient of the first material is lower than a linear expansion coefficient of the second material.

2. The projection lens unit according to claim 1, wherein the lens holder holds a lens group of the lens groups disposed on a side closest to the image forming panel in the lens barrel.

3. The projection lens unit according to claim 2, wherein the first part is engaged with the second part and extends in a peripheral direction of the lens group.

4. The projection lens unit according to claim 3, wherein the second part is a frame portion.

5. The projection lens unit according to claim 3, wherein the second part includes a plane surface and the first part is disposed closer to the image forming panel than the plane surface of the second part.

6. The projection lens unit according to claim 2, wherein the second part is a frame portion.

7. The projection lens unit according to claim 6, wherein the second part includes a plane surface and the first part is disposed closer to the image forming panel than the plane surface of the second part.

8. The projection lens unit according to claim 2, wherein the second part includes a plane surface and the first part is disposed closer to the image forming panel than the plane surface of the second part.

9. The projection lens unit according to claim 1, wherein the first part is engaged with the second part and extends in a peripheral direction of the lens group.

10. The projection lens unit according to claim 9, wherein the second part is a frame portion.

11. The projection lens unit according to claim 10, wherein the second part includes a plane surface and the first part is disposed closer to the image forming panel than the plane surface of the second part.

12. The projection lens unit according to claim 9, wherein the second part includes a plane surface and the first part is disposed closer to the image forming panel than the plane surface of the second part.

13. The projection lens unit according to claim 1,
wherein the second part is a frame portion.

14. The projection lens unit according to claim 13,
wherein the second part includes a plane surface and the first part is disposed closer to the image forming panel than the plane surface of the second part.

15. The projection lens unit according to claim 1,
wherein the second part includes a plane surface and the first part is disposed closer to the image forming panel than the plane surface of the second part.

16. The projection lens unit according to claim 1,
wherein the first material is a metal material and the second material is a resin material.

17. The projection lens unit according to claim 1, further comprising:
an aperture stop,
wherein the lens holder holds the lens group disposed closer to the image forming panel than the aperture stop.

18. The projection lens unit according to claim 1,
wherein the first part is positioned corresponding to the second part that is positioned on a side opposite to the side to which the image forming panel is shifted.

19. A projector comprising:
the projection lens unit according to claim 1;
the image forming panel; and
a light source that applies light to the image forming panel.

20. The projector according to claim 19,
wherein in a case in which a distance between the optical axis of the projection lens unit and the center of the image forming panel is denoted by Y, a length of the image forming panel in a shift direction which the image forming panel is shifted from the optical axis is denoted by H, and a shift ratio of the image forming panel obtained by dividing the length H into the distance Y is defined by "$S=Y/H$", and "$0.4<S<0.7$" is satisfied.

* * * * *